March 24, 1942.   J. M. REDINGER   2,277,354
TOOL HOLDER
Filed April 6, 1940
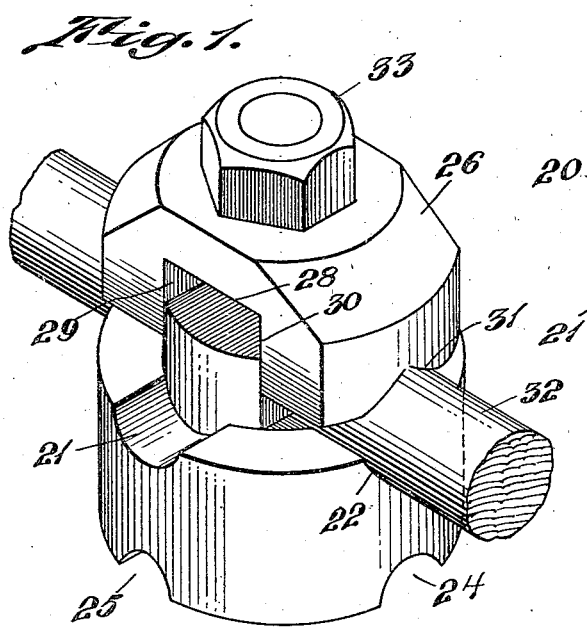
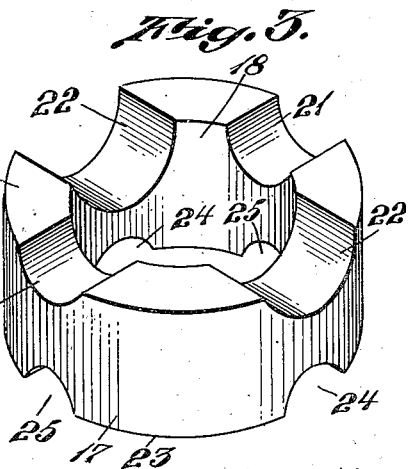
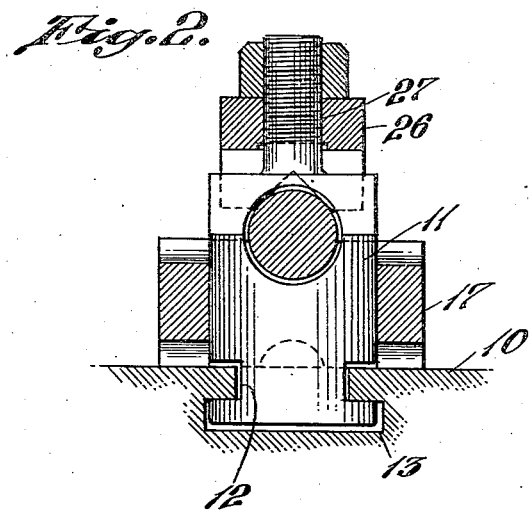
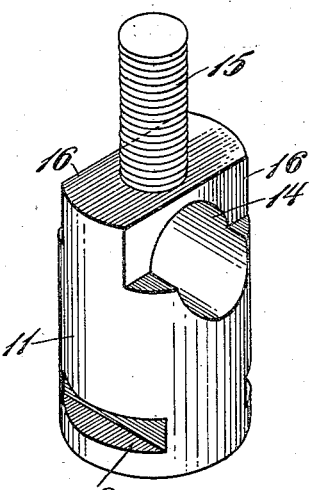
INVENTOR.
Joseph M. Redinger
BY Barlow & Barlow
ATTORNEYS.

Patented Mar. 24, 1942

2,277,354

UNITED STATES PATENT OFFICE 2,277,354

TOOLHOLDER

Joseph M. Redinger, Johnston, R. I.

Application April 6, 1940, Serial No. 328,340

2 Claims. (Cl. 82—37)

This invention relates to a tool holder, more particularly of that type used for the mounting of a boring bar in a lathe for centerboring a piece of work held in a chuck; and the invention has for one of its objects to provide a tool holder which may be utilized for the mounting of tools of different diameters.

Another object of the invention is to provide a single tool holder having several receiving recesses each of which may be presented for receiving the tool by simple manipulation of one of the parts so as to bring into operative position the desired selected recess.

A further object of the invention is to provide a collar with notches in its edge and which may be so manipulated that both of its opposite edges may be utilized for the mounting of tools of different diameters.

With these and other objects in view, the invention consists of certain novel features of construction, as will be more fully described and particularly pointed out in the appended claims.

In the accompanying drawing:

Fig. 1 is a perspective view of the tool holder showing a portion of a boring bar mounted therein;

Fig. 2 is a sectional view on a smaller scale showing the tool holder as mounted in the cross slide of a lathe;

Fig. 3 is a perspective view of the bottom clamp or collar; and

Fig. 4 is a perspective view on a different scale of the post through which the parts operate.

In the use of a boring bar in a lathe, it is quite frequent that when the size of the boring bar is to be changed the entire tool holder is changed for the accommodation of a boring bar of a different size. This requires a large number of tool holders for such boring bars. In order that tool holding equipment may be simplified, I have provided a tool holder which may accommodate several different size boring bars by a simple manipulation of the tool holder either to position the collar or one of its clamps in a different position of angular rotation or by turning the collar over and selecting its desired position of angular rotation; and the following is a more detailed description of the present embodiment of this invention, illustrating the preferred means by which these advantageous results may be accomplished:

With reference to the drawing, 10 designates the fragmentally shown cross slide of a lathe with a tool post 11 provided with slots 12 located in the inverted T-slot 13 of the cross slide for movement therein to the desired location. This tool post is generally cylindrical as illustrated in Fig. 4 and is provided with a laterally extending opening 14 through which the boring bar or other tool to be mounted may extend. The post is reduced in diameter and threaded as at 15, while it is cut away to provide parallel guide surfaces 16 at right angles to the axis of the opening 14 on either side for the guiding of a clamp in its movement to and from binding position.

A collar 17 is generally cylindrical in shape and provided with a central opening 18 of a size to loosely fit the post 11. This collar may be freely turned about the post or slid vertically of the post when the post is mounted in the cross slide. In one edge, 20, of this collar, there are provided opposite recesses 21, 21 diametrically aligned on opposite sides of the collar while at another location there are recesses 22, 22 also diametrically aligned on opposite sides of the collar. The recesses 21 and 22 will be of different sizes for the accommodation of different boring bars therein. On the opposite edge 23 of the collar there are other diametrically opposite recesses 24, 24 and 25, 25 which are likewise of different sizes and also of different sizes than the recesses 21 or 22 for the accommodation of still different sizes or diameter boring bars.

A top clamp 26 is provided with an opening 27 to slidably receive the post 15 and provided with a channel 28 having opposite guide surfaces 29 and 30 to slide along and be guided by the opposite surfaces 16 of the post as it is moved vertically on the post. A V-shaped recess 31 is provided in the opposite arm portion of this top clamp 26 for the engagement with the boring bar to be bound. This V-shaped recess will accommodate all of the various sized bars received in the recesses 21, 22, 24 and 25.

In operation the recess in the collar either 21, 22, 24 or 25 is selected which closest fits the boring bar 32 and is placed uppermost and in general alignment with the opening 14 in the post, the post being mounted in the cross slide of the lathe and the collar 17 resting upon the cross slide. The boring bar 32 is positioned in the recess selected, such for instance, as 22, while the bar 32 extends through the opening 14. The top clamp 26 is then brought down so that its notch 31 engages the bar 32 and the nut 33 is then turned down upon the threaded portion 15 of the post to draw the post 11 upwardly and force the boring bar and the top clamp and collar downwardly against the cross slide, thereby binding the boring bar in position and at the same time binding the post and collar to the cross slide.

Should it be desired to change the boring bar to a size which is best suited to the notch 21, it is merely necessary to remove the bar 32, turn the collar 21 through 90 degrees until its recess substantially registers with the opening 14 and then put in the different size boring bar and clamp the parts as previously described. Should the boring bar next selected best fit the recess either 24 or 25, the top clamp and nut 33 are removed and the collar is turned over and the other recesses 24 or 25 brought into registry with the opening 14 and the boring bar then put in position and clamped in a manner as previously described.

I have illustrated a tool holder adapted to receive four different size boring bars, but it will be readily apparent that any number of recesses may be placed in the collar, dependent upon the size of the collar and the size of the recesses, and by this arrangement I may materially reduce the number of tool holders necessary for the accommodation of a large variety of different sized boring bars.

The foregoing description is directed solely towards the construction illustrated, but I desire it to be understood that I reserve the privilege of resorting to all the mechanical changes to which the device is susceptible.

I claim:

1. A tool mounting comprising a cylindrical post, the upper portion of which is provided with diametrically oppositely positioned flat parallel guiding surfaces, and the lower portion of which is provided with oppositely disposed slots therein for mounting said post upon a support, said post having an opening therein extending through said guiding surfaces and at right angles thereto and a threaded stud extending from the upper portion thereof, a collar encircling said post and provided in its upper and lower edge with a plurality of diametrically oppositely aligned recesses of different sizes for the reception of tools of different dimensions, a clamp positioned on said post having a recess therein provided with opposite substantially parallel walls arranged to engage and be guided on said post by said guiding surfaces and provided with a groove extending on either side of said recess and at right angles thereto and arranged to rest upon a tool extending through the opening in said post and resting in one of the recesses on said collar, said clamp having an opening therein extending from said recess for the reception of said threaded stud, and a nut on said stud movable thereon to engage and move said clamp toward said collar to bind the tool therebetween.

2. A tool mounting comprising a cylindrical post, the upper portion of which is provided with diametrically oppositely positioned flat parallel guiding surfaces, and the lower portion of which is provided with oppositely disposed slots therein for mounting said post upon a support, said post having an opening therein extending through said guiding surfaces and at right angles thereto and a threaded stud extending from the upper portion thereof, a collar encircling said post and provided in its upper and lower edge with a plurality of diametrically oppositely aligned recesses of different sizes for the reception of tools of different dimensions, a clamp positioned on said post having a recess therein provided with opposite substantially parallel walls arranged to engage and be guided on said post by said guiding surfaces and having an opening therein extending from said recess for the reception of said threaded stud and provided with a substantially V-shaped groove extending outwardly from said recess at right angles from the wall thereof for engaging a tool extending through the opening in said post and resting in a recess on said collar, and a nut on said stud movable thereon to engage and move said clamp toward said collar to bind the tool therebetween.

JOSEPH M. REDINGER.